United States Patent [19]

Hanus et al.

[11] 4,317,032
[45] Feb. 23, 1982

[54] PULSE GENERATOR FOR VARIABLE-SPEED DRIVES

[75] Inventors: Helfried Hanus, Karlsruhe-Durlach; Uwe Winkler, Ettlingen; Patrice J. Kemmel, Stutensee, all of Fed. Rep. of Germany

[73] Assignee: Pfaff Haushaltmaschinen GmbH, Fed. Rep. of Germany

[21] Appl. No.: 92,192

[22] Filed: Nov. 7, 1979

[30] Foreign Application Priority Data

Nov. 9, 1978 [DE] Fed. Rep. of Germany ....... 2848612

[51] Int. Cl.³ .............................................. G01D 5/34
[52] U.S. Cl. ............................. 250/231 SE; 250/239
[58] Field of Search ............. 250/231 SE, 237 G, 239, 250/211 K; 356/395; 324/175

[56] References Cited

U.S. PATENT DOCUMENTS

| | | | |
|---|---|---|---|
| 3,419,727 | 12/1968 | Pabst | 250/231 SE |
| 3,997,782 | 12/1976 | Willits | 250/239 |
| 4,182,953 | 1/1980 | Hurley et al. | 250/231 SE |
| 4,184,071 | 1/1980 | Fryer et al. | 250/237 G |
| 4,193,199 | 3/1980 | Whiteley et al. | 250/231 SE |

*Primary Examiner*—David C. Nelms
*Attorney, Agent, or Firm*—McGlew and Tuttle

[57] ABSTRACT

A pulse generator of variable-speed drives, particularly sewing machine drives having a main rotatable shaft and a housing comprising a casing defining an inner space connected to the sewing machine housing, a generator shaft rotatable and synchronous with the main shaft and mounted for rotation in the casing, a pulse disc with light-dark zones connected to the shaft and rotatable within the inner space of the casing, a light transmitting module and a light receiving module connected to the casing, the casing including bearing surfaces on either side of the disc bearing against and bearing surfaces of the shaft for supporting the pulse disc for rotation. Bearing surfaces provide a seal against stray light and dust and the like and also accurately center and support the pulse disc.

8 Claims, 6 Drawing Figures

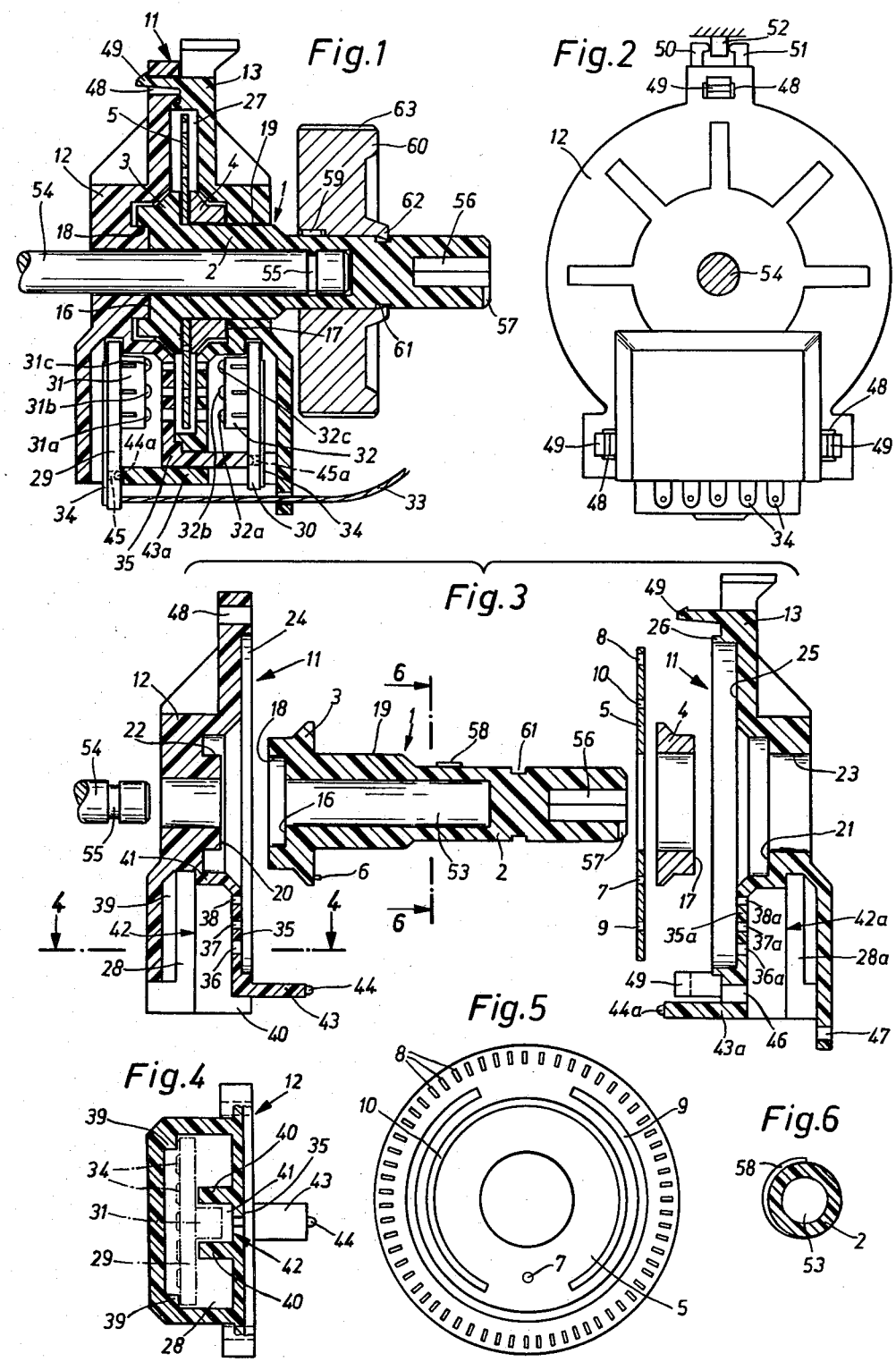

PULSE GENERATOR FOR VARIABLE-SPEED DRIVES

FIELD AND BACKGROUND OF THE INVENTION

The present invention relates in general to pulse generators for variable speed drives, and in particular, to a new and useful pulse generator for sewing machine drives comprising a shaft rotating in synchronism with the main shaft of a machine having a pulse disc thereon with light and dark zones. The pulse disc is mounted for rotation with a casing which is provided with axial and radial bearing surfaces on either side of the pulse disc for centering the pulse disc as it rotates and for functioning as a shield and seal against exterior dust, oil and the like.

In prior art pulse generators of this kind, the casing accommodating the light transmitting and light receiving modules is mounted unilaterally on a shaft carrying the pulse disc. Since the pulse disc is partly provided with light-dark zones which are very narrow, the position of the light transmitting and light receiving modules must be adjusted and maintained during operation with an extreme accuracy, to ensure a quite satisfactory function of the modules. Known arrangements, therefore, require an expensive mounting to prevent the casing from executing any undesirable oscillatory motion during rotation of the pulse disc which might unfavorably affect the function of the pulse generator. Such arrangements also require a complicated design and their assemblage is expensive if a reliable operation of the pulse generator is desired.

SUMMARY OF THE INVENTION

The purpose of the present invention is to eliminate the drawbacks of the prior art devices. The invention is directed to an automatic centering of the pulse disc and the casing relative to each other during the assembly of the casing, and accurate positioning of the pulse disc relative to the light transmitting and light receiving modules accommodated in the casing.

Due to the bilateral support of the casing enclosing the pulse disc, an extremely accurate axial and radial alignment of the casing and hence also of the transmitting and receiving modules secured thereto, is obtained.

A suitable design of the casing as a carrier of the transmitting and receiving modules is achieved with a perfect sealing of the pulse disc and the modules against dust, oil and stray light as well.

The features of the invention ensure a fairly simple and reliably effective connection between the pulse generator and the drive.

Accordingly, an object of the present invention is to provide a pulse generator for variable-speed drive, particularly sewing machine drives having a main shaft, comprising a generator shaft rotatable in synchronism with the main shaft, a pulse disc with light and dark areas thereon which is fixed to the generator shaft and extends between a light transmitting module and a light receiving module, the light transmitting and receiving modules being secured in a casing surrounding the pulse disc and connected to a housing of the sewing machine, with bearing surfaces defined in the casing on either side of the disc for mounting the generator shaft for rotation within the casing and for excluding dust, debris, oil and stray light from the interior of the casing.

A further object of the present invention is to provide a pulse generator of the aforementioned type having two casing parts which are connected to each other each having a receiving chamber for the light transmitting and receiving modulus respectively with axial parallel apertures extending through portions of the casing between the receiving chamber and an inner space of the casing in which the disc is mounted.

Another object of the present invention is to provide a pulse generator of the aforementioned type wherein the receiving chamber for the module is designed as a slide-in component for a circuit board carrying the light transmitting and light receiving modules.

A still further object of the present invention is to provide a pulse generator of the aforementioned type wherein the receiving chamber is closed off by a circuit board comprising part of the light transmitting or light receiving modules.

Another object of the present invention is to provide a pulse generator which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS

In the Drawings:

FIG. 1 is a longitudinal sectional view of the pulse generator;

FIG. 2 is a side elevational view of the pulse generator of FIG. 1;

FIG. 3 is an exploded sectional view of the casing and the disc carrier of FIG. 1;

FIG. 4 is a sectional view taken along the line 4—4 of FIG. 3;

FIG. 5 is a top plan view of the pulse disc; and

FIG. 6 is a sectional view taken along the line 6—6 of FIG. 3.

DESCRIPTION OF THE PREFERRED EMBODIMENT

The pulse generator of the present invention comprises a disc carrier 1 (FIGS. 1 and 3) including a shaft 2 with a backing shoulder 3, and a clamp ring 4. A pulse disc 5 is sealed against backing shoulder 3. The disc is secured against rotation on shaft 2 by means of a stud 6 which is provided on backing shoulder 3 and engages a bore 7 of pulse disc 5. Pulse disc 5 is substantially opaque, with transparent zones provided in concentric circles defining light-dark zones. Narrow transparent windows 8 (FIG. 5) are provided along the outer circle and transparent circular segments 9, 10 extend along the mid- and inner circles. Pulse disc 5 is pressed against backing shoulder 3 by means of a clamp ring 4 (FIGS. 1 and 3) which is force-fitted on shaft 2.

Pulse disc 5 is enclosed in a casing 11 which is assembled of two casing parts 12 and 13, and supported at appropriate locations on disc carrier 1. For this purpose, axially effective bearing surfaces 16 and 17, and radially effective bearing surfaces 18 and 19 are provided on carrier 1 which cooperate with corresponding axially effective bearing surfaces 20 and 21 and radially effective bearing surfaces 22 and 23 provided on casing parts 12 and 13. Casing part 12 is provided with a circular recess 24 and casing part 13 with a circular recess 25. Recess 25 is surrounded by a projecting circular rim 26 which, in the assembled state of casing 11, engages recess 24. The two recesses 24 and 25 then form an enclosed inner space 27 for pulse disc 5.

Casing parts 12 and 13 each have a receiving chamber 28, 28a (see also FIG. 4) for receiving a circuit board 29, 30 equipped with a light transmitting module 31 or light receiving module 32, respectively. Modules 31 and 32 each comprise three light transmitters 31a, 31b and 31c or three light receivers 32a, 32b, 32c, which are connected in proper manner, through leads 33 and printed tracks 34 on circuit boards 29 and 30, to one another and to the motor controls of the sewing machine. Each of the light transmitters 31a, 31b, 31c is positioned opposite the corresponding one of the light receivers 32a, 32b, 32c at such a radial distance from the axis of rotation of pulse disc 5 that the outer light beam from transmitter 31a falls on the circle or circumference of windows 8, and the median and inner light beams from transmitters 31b, 31c fall on the mid-and inner circles or circumferences of circular segments 9 and 10 respectively. In the straight line connecting a respective light transmitter 31a, 31b, 31c with its associated light receiver 32a, 32b, 32c, apertures 36, 37, 38 are provided in the partition wall 35 between receiving chamber 28 and inner space 27 of the casing 11, and apertures 36a, 37a, 38a are provided in the partition 35a between receiving chamber 28c and inner space 27.

Circuit board 29 can be introduced into receiving chamber 28 where it applies, on the one hand, against two spaced-apart stop shoulders 39 and, on the other hand, against two ribs 40 which also are spaced apart from each other. The two ribs 40, along with a connecting web 41 and partition wall 35, form a box 42 enclosing module 31 at all but two sides.

Receiving chamber 28a is of symmetrical and substantially the same design, so that no separate description is necessary. The individual elements are designated with identical numerals, only with the index letter a.

As soon as circuit board 29 is inserted into receiving chamber 28, the respective open side of box 42 is closed by the board, as shown in FIG. 4. Upon assembling casing parts 12 and 13, a plate 43a provided on casing part 13 is shifted over the slide-in opening of box 42, to completely enclose light transmitting module 31 which is then protected against dust and light penetration. On the leading end of plate 43a, an extension 44a is provided with engages a corresponding opening 45 in circuit board 29 thereby fixing the board in its position.

A plate 43 which is provided on casing part 12 is inwardly offset relative to, and by the thickness of, plate 43a and is shifted, during the assembly of casing part 12 and 13, through a slot 46 of casing part 13 and over the slide-in opening of box 42a. A slot 47 for receiving leads 33 is provided in casing part 13 in addition.

Casing part 12 has openings 48 (see also FIG. 2) which, as casing parts 12 and 13 are assembled, engage over locking elements 49 provided on casing part 13. Elements 49 engage the wall of casing part 12 from behind, thereby securing the assembled state of parts 12 and 13.

Casing part 13 carries two symmetrically designed projections 50 and 51 which engage over an opposite stop 52 provided on the housing of the machine.

Disc carrier 1 is designed with an axial bore 53 for engaging on the free end of a shaft 54 which rotates in synchronism with the main shaft of the sewing machine and is provided, near its end, with a groove 55. An axial hole 56 with a hexagonal cross section extending in the end portion of disc carrier 1, is intended for introducing a hexagon head wrench. On this end, disc carrier 1 is provided with a mark 57.

In the zone of groove 55 of shaft 54, disc carrier 1 is provided with an eccentric enlargement 58 which is designed as a spiral spline. A lock ring 60 is mounted on disc carrier 1 and provided with a spiral recess 59 which corresponds to enlargement 58 and cooperates therewith. Lock 60 is further provided with lateral noses 62 which engage in a circular groove of disc carrier 1. The circumferential surface 63 of lock ring 60 is knurled to facilitate handling.

To assemble the pulse generator, pulse disc 5 is placed against backing shoulder 3 of shaft 2 and turned until stop 6 engages bore 7. Then, clamp ring 4 is fitted on shaft 2 and pressed against pulse disc 5. Upon engaging casing part 13 on shaft 2, lock ring 60 is slipped on shaft 2 where it is displaced until noses 62 snap into circular groove 61.

Thereupon, the two circuit boards 29 and 30 are inserted in receiving chambers 28 and 28a of casing parts 12 and 13, leads 33 are inserted in slot 47, and the casing parts are interlocked with each other. This means that locking elements 49 of casing part 13 pass through openings 48 in casing part 12 and engage from behind on the wall of casing part 12.

At the same time plates 43 and 43a are shifted over boxes 42 and 42a, so that modules 31 and 32 become completely screened to the outside. Further, in the final position of plates 43 and 43a, extensions 44 and 44a provided thereon engage openings 45 and 45a of circuit boards 29 and 30, so that the boards are secured in their position.

As the two casing parts 12 and 13 are interlocked with each other, their bearing surfaces 20 to 23 are shifted to engage bearing surfaces 16 to 19 of shaft 2. Since casing 11 is thus supported on disc carrier 1 at either side of pulse disc 5, a precise guidance of casing 11 is obtained and an exact alignment both in axial and radial direction of pulse disc 5 and modules 31, 32 fixed in receiving chambers 28, 28a of casing 11 is ensured.

The pulse generator is secured to shaft 54 of the machine after disc carrier 1 is engaged thereon. First, by means of a conventional hexagon head wrench introduced into opening 56 of shaft 2, pulse disc 5 is turned, by turning disc carrier 1, so as to bring mark 57 into a desired position. Then, disc carrier 1 is secured in this position by turning lock ring 60. This rotary motion causes the opposite wedge surfaces of enlargement 58 on shaft 2 and recess 59 in lock ring 60 to become squeezed together whereby a portion of shaft 2 in this cross sectional zone is pressed against shaft 54. This secures disc carrier 1 against rotary motion on shaft 54. That is, as shaft 2 is pressed against shaft 54, some of the material of shaft 2 which, preferably, is made of a thermoplastic, undergoes plastic deformations and is pressed into groove 55 of shaft 54, so that the pulse generator become satisfactorily fixed also in the axial direction.

While a specific embodiment of the invention has been shown and described in detail to illustrate the application of the principles of the invention, it will be understood that the invention may be embodied otherwise without departing from such principles.

What is claimed is:

1. A pulse generator for variable speed drives, particularly sewing machine drives having a main rotatable shaft and a housing, comprising:
    a casing defining an inner space;
    a generator shaft rotatably mounted in said casing and rotatable in synchronism with the main shaft of the sewing machine drive;
    a pulse disc having light-dark zones connected to said generator shaft in said inner space;
    a light transmitting module and a light-receiving module in said casing disposed on either side of at least a portion of said pulse disc;
    said casing including on either side of said pulse disc and spaced from said pulse disc, bearing surfaces bearing against corresponding bearing surfaces of said generator shaft for centering and rotatably mounting said pulse disc in said inner space of said casing, said bearing surfaces including axially extending and radially extending surfaces relative the axis of the said generator shaft to axially and radially hold the position of said casing with respect to said generator shaft;
    said casing comprising two casing parts each having one receiving chamber for radially receiving one of said light-transmitting and light-receiving modules respectively;
    each of said casing parts including a radial wall separating said receiving chamber from said inner space with a plurality of axially extending parallel apertures extending through each wall between each of said receiving chambers and said inner space for the passage of light between said light-transmitting module and said light-receiving module and through portions of said pulse disc;
    each of said light-transmitting and light-receiving modules including a circuit board, each of said receiving chambers comprising a slide-in compartment for radially receiving each of said circuit boards respectively; and
    each of said receiving chambers of each casing parts being closed when said casing parts are assembled to form said casing by a cover plate extending from the other of said casing parts.

2. A pulse generator according to claim 1, including at least two spaced stop members extending from one of said two casing parts, and a fixed stop connected to the sewing machine embraced between said two stop members for holding said casing from rotating with rotation of said generator shaft, whereby said casing is supported on said generator shaft and said fixed stop.

3. A pulse generator according to claim 1 wherein each of said circuit boards includes an opening therein, each of said cover plates including an extension extending into one of said openings respectively when said two casing parts are assembled to form said casing.

4. A pulse generator according to claim 1 wherein one of said casing parts includes at least one opening therethrough and the other of said casing parts includes at least one locking element extending therefrom and into said opening when said casing parts are assembled to form said casing.

5. A pulse generator according to claim 1, wherein said generator shaft is substantially hollow, and including an additional shaft extending into the hollow of said generator shaft and force-fit thereto for rotation and syncronous with the main shaft of the sewing machine.

6. A pulse generator according to claim 5 further including an eccentric enlargement on the outer surface of said generator shaft, a lock nut engageable over said generator shaft including an eccentric recess engaged with said eccentric enlargement, said lock ring fixed to said generator shaft by the rotation of said lock ring with respect to said generator shaft.

7. A pulse generator according to claim 6 wherein the connection between said generator shaft and said lock ring comprises a spiral spline locking connection.

8. A pulse generator according to claim 7 wherein said lock ring further includes at least one nose extending radially inwardly therefrom, said generator shaft including an annular groove, said nose engaged in said annular groove.

* * * * *